(12) United States Patent
Chen et al.

(10) Patent No.: US 10,409,626 B1
(45) Date of Patent: *Sep. 10, 2019

(54) HIERARCHICAL ACCELERATOR REGISTRY FOR OPTIMAL PERFORMANCE PREDICTABILITY IN NETWORK FUNCTION VIRTUALIZATION

(71) Applicant: Altera Corporation, San Jose, CA (US)

(72) Inventors: Allen Chen, San Jose, CA (US); Abdel Rabi, High Wycombe (GB)

(73) Assignee: Altera Corporation, San Jose, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/287,026

(22) Filed: Oct. 6, 2016

Related U.S. Application Data

(63) Continuation of application No. 14/609,306, filed on Jan. 29, 2015, now Pat. No. 9,483,291.

(51) Int. Cl.
  *G06F 9/46* (2006.01)
  *G06F 9/455* (2018.01)

(52) U.S. Cl.
  CPC .............. *G06F 9/45533* (2013.01)

(58) Field of Classification Search
  CPC ................................. G06F 9/45533
  See application file for complete search history.

(56) References Cited

U.S. PATENT DOCUMENTS

| 5,983,310 | A * | 11/1999 | Adams ................. G06F 9/3802 710/8 |
| 6,912,221 | B1 | 6/2005 | Zadikian et al. |
| 7,843,926 | B1 | 11/2010 | Muller et al. |
| 9,147,024 | B1 | 9/2015 | Kathail et al. |
| 2009/0259804 | A1* | 10/2009 | Shkidt ................ G06F 13/4243 711/103 |
| 2009/0328036 | A1* | 12/2009 | Betts-LaCroix ....... G06Q 30/06 718/1 |
| 2012/0005678 | A1* | 1/2012 | Ge ........................ G06F 9/4856 718/1 |

(Continued)

OTHER PUBLICATIONS

"Deploying Extremely Latency-Sensitive Applications in VMware vSphere 5.5" VM Ware, Oct. 10, 2013, 17 pages.

(Continued)

*Primary Examiner* — Camquy Truong
(74) *Attorney, Agent, or Firm* — Treyz Law Group, P.C.; Jason Tsai

(57) ABSTRACT

A virtualization platform for Network Functions Virtualization (NFV) is provided. The virtualization platform may include a host processor coupled to an acceleration coprocessor. The acceleration coprocessor may be a reconfigurable integrated circuit to help provide improved flexibility and agility for the NFV. To help improve performance predictability, a hierarchical accelerator registry may be maintained on the coprocessor and/or on local servers. The accelerator registry may assign different classes and speed grades to various types of available resources to help the virtualized network better predict certain task latencies. The accelerator registry may be periodically updated based on changes detected in the local storage and hardware or based on changes detected in remote networks.

15 Claims, 7 Drawing Sheets

(56) References Cited

U.S. PATENT DOCUMENTS

| | | | |
|---|---|---|---|
| 2012/0254587 A1* | 10/2012 | Biran | G06F 9/3877 |
| | | | 712/34 |
| 2014/0201374 A1 | 7/2014 | Ashwood-Smith et al. | |
| 2014/0241247 A1 | 8/2014 | Kempf et al. | |
| 2015/0052332 A1* | 2/2015 | Mortensen | G06F 15/7889 |
| | | | 712/37 |
| 2016/0227375 A1* | 8/2016 | Farrell | G08G 1/205 |

OTHER PUBLICATIONS

Network Functions Virtualisation (NVF) NVF Performance & Portability Best Practises Network Functions 2 Virtualisation (NVF) ETSI Industry Specification Group (ISG), Jun. 2014, 65 pages.

* cited by examiner

| | HIERARCHICAL ACCELERATOR AVAILABLE REGISTRY | |
|---|---|---|
| CLASS | TYPE | PREDICTABLE PERFORMANCE CONSIDERATION |
| 1 | On-Chip and active | Fast and predictable acceleration |
| 2 | Local PR accelerator image available | Requires PR reprogramming overhead |
| 3 | Remote PR library path reachable | Requires overhead for fetching remote image and PR reprogramming |
| ⋮ M | ⋮ | ⋮ |

FIG. 5

HIERARCHICAL ACCELERATOR REGISTRY FOR OPTIMAL PERFORMANCE PREDICTABILITY IN NETWORK FUNCTION VIRTUALIZATION

This application is a continuation of patent application Ser. No. 14/609,306, filed Jan. 29, 2015, which is hereby incorporated by reference herein in its entirety. This application claims the benefit of and claims priority to patent application Ser. No. 14/609,306, filed Jan. 29, 2015.

BACKGROUND

The growth of the Internet has helped create a network of networks that link together billions of devices worldwide. Conventionally, the fastest and most reliable networks are built with custom application-specific integrated circuits (ASICs) and purpose-built hardware. As a result, large enterprise networks often resemble complex, monolithic systems. In such types of custom systems, adding features ad hoc and making changes to these systems while ensuring that the network does not experience any interruptions is very challenging.

Due to recent network focused advancements in commodity computing hardware, services that were previously only capable of being delivered by proprietary, application-specific hardware can now be provided using software running on commodity hardware by utilizing standard information technology (IT) virtualization techniques that run on high-volume server, switch, and storage hardware to virtualize network functions. By leveraging standard IT virtualization technology to consolidate different types of network equipment onto commercial "off-the-shelf" high volume servers, switches, and storage, network functions such as network address translation (NAT), firewalling, intrusion detection, domain name service (DNS), load balancing, and caching (just to name a few) can be decoupled from propriety hardware and can instead be run in software. This virtualization of network functions on commodity hardware is sometimes referred to as Network Functions Virtualization (NFV).

In an effort to develop a fully virtualized infrastructure, leading service providers have come together and created the European Telecommunications Standards Institute (ETSI) Industry Specification Group (ISG) for Network Functions Virtualization (NFV). This group has helped create the architecture and associated requirements for virtualizing various functions within telecommunications networks. Benefits of Network Functions Virtualization include reduced capital expenditure (i.e., by reducing the need to purchase purpose-built hardware), operating expenditure (i.e., by reducing space, power, and cooling requirements), reduced time-to-market (i.e., accelerated deployment), improved flexibility to address constantly changing demands, etc.

It is within this context that the embodiments described herein arise.

SUMMARY

In accordance with an embodiment, a Network Functions Virtualization (NFV) platform is provided that includes a host processor coupled to a reconfigurable coprocessor serving as a hardware accelerator. The coprocessor may include virtual function hardware accelerator modules that serve to improve the performance for at least some virtual machine running on the host processor. The coprocessor may also include a virtualization accelerator management module that maintains a hierarchical accelerator resource availability registry that specifies latency information corresponding to different types of resources that are available to the coprocessor for assisting with the NFV. The accelerator registry may be maintained on the coprocessor and/or on a local server.

The virtualization accelerator management module may be controlled by a hypervisor and/or associated software drivers running on the host processor. In particular, the hierarchical registry may be configured to assign a first speed grade to resources that are presently active on the coprocessor, to assign a second speed grade that is considered "slower" and less predictable than the first speed grade to resources that can be retrieved from a local storage device (e.g., from a local flash drive, a local DDR SDRAM, from a local solid-state drive, etc.), and to assign a third speed grade that is considered even slower and less predictable than the second speed grade to resources that can be retrieved from a remote storage device (e.g., from solid-state drives, hard disk drives, and archive systems in a remote network).

The accelerator registry may be initially constructed by synchronizing the host processor with other processing units in a local network or a remote network to identify first resources that are available to the other processing units, by reading data from the local storage devices to identify second resources that are stored locally, and by retrieving current status information to identify third resources that are currently available on the coprocessor. The accelerator registry may be periodically updated in response to detecting a protocol trigger event that directs the host processor to synchronize with other processors, in response to detecting that a given file has been altered (e.g., moved, deleted, copied, etc.) on the local storage devices, and/or in response to detecting that the coprocessor has been at least partially reconfigured to engage the resources stored on the local network or retrieved from a remote network.

Further features of the present invention, its nature and various advantages will be more apparent from the accompanying drawings and the following detailed description.

BRIEF DESCRIPTION OF THE DRAWINGS

FIG. 5 is a diagram of an illustrative hierarchical accelerator availability register in accordance with an embodiment.

DETAILED DESCRIPTION

Embodiments of the present invention relate to Network Functions Virtualization (NFV) and more particularly, to hardware acceleration for NFV. It will be recognized by one skilled in the art, that the present exemplary embodiments may be practiced without some or all of these specific details. In other instances, well-known operations have not been described in detail in order not to unnecessarily obscure the present embodiments.

Conventionally, complex networks are built using fragmented, non-commodity hardware. When expanding or upgrading the network, new application-specific hardware needs to be installed, which not only increases deployment costs for existing vendors but also presents a large barrier to entry for new vendors, limiting innovation and competition.

In an effort to accelerate the deployment of new network services to satisfy the ever-increasing consumer demand for improved network speed and reliability, the vendors (e.g., telecommunications "operators" or "service providers" such AT&T, Verizon, British Telecom, etc.) have come together and created the European Telecommunications Standards Institute (ETSI) Industry Specification Group (ISG). The ETSI ISG have since introduced virtualization technologies that can be applied to networking technologies to create a more intelligent and more agile service infrastructure. This concept of running network functions such as those performed traditionally by application-specific routers, firewalls, load balancers, content delivery networks (CDN), broadband network gateways (BNG), network address translators (NAT), domain name systems (DNS), and other networking devices in software on commodity hardware is sometimes referred to as Network Functions Virtualization (NFV).

Figure 1:
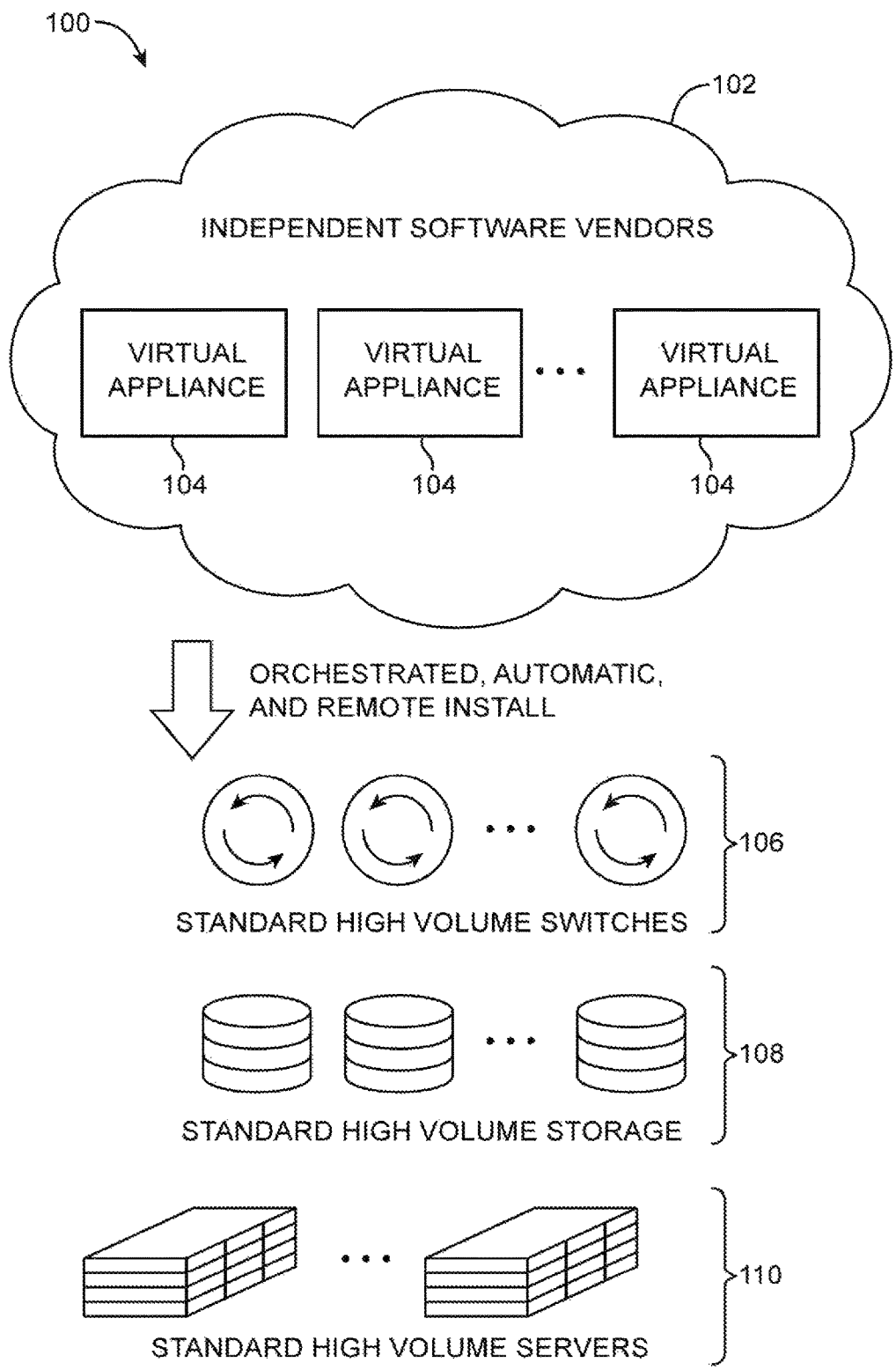
FIG. 1 is a diagram illustrating Network Functions Virtualization (NFV) in accordance with an embodiment.

The concept of Network Functions Virtualization is illustrated in FIG. 1. As shown in system 100 in FIG. 1, NFV allows services offered by a plurality of independent vendors to run separately on one or more virtual appliances 104 in a cloud 102. Effectively, the network services offered by the different software vendors can be implemented using virtual appliances 104 running on commercial off-the-shelf hardware, which includes but is not limited to standard high volume switches 106, standard high volume storage 108, and standard high volume servers 110 (e.g., the network functions can be orchestrated and remotely installed on commodity physical infrastructure rather than on more expensive purpose-built manufacturer-designed hardware).

Shifting different network components to commodity hardware helps to eliminate use of more costly specialized hardware for different applications onsite and therefore helps to eliminate wasteful overprovisioning and can substantially reduce capital expenditure. Virtualization of the overall infrastructure also helps to streamline the operational processes and equipment that are used to manage the network. Since all the services are run on the same commodity hardware, datacenter operators no longer need to support multiple vendor and hardware models, thereby simplifying the base hardware support/management and providing a unified infrastructure that allows for automation and orchestration within and among different services and components.

For example, network administrators can coordinate (within the NFV framework) resource availability and automate the procedures necessary to make the services available, which reduces the need for human operators to manage the process and therefore reduces the potential for error. Moreover, NFV can also help reduce the time to deploy new networking services with minimal disruption to the network infrastructure to help seize new market opportunities and to improve return on investments (ROI) on new services while providing enhanced agility and flexibility by allowing the services to be quickly scaled up or down in software to address customer demands. If desired, NFV may be implemented in conjunction with the Software Defined Networking (SDN) approach that separates the network's control and forwarding planes to provide a more centralized view of the distributed network for a more efficient orchestration and automation of network services.

Figure 2:
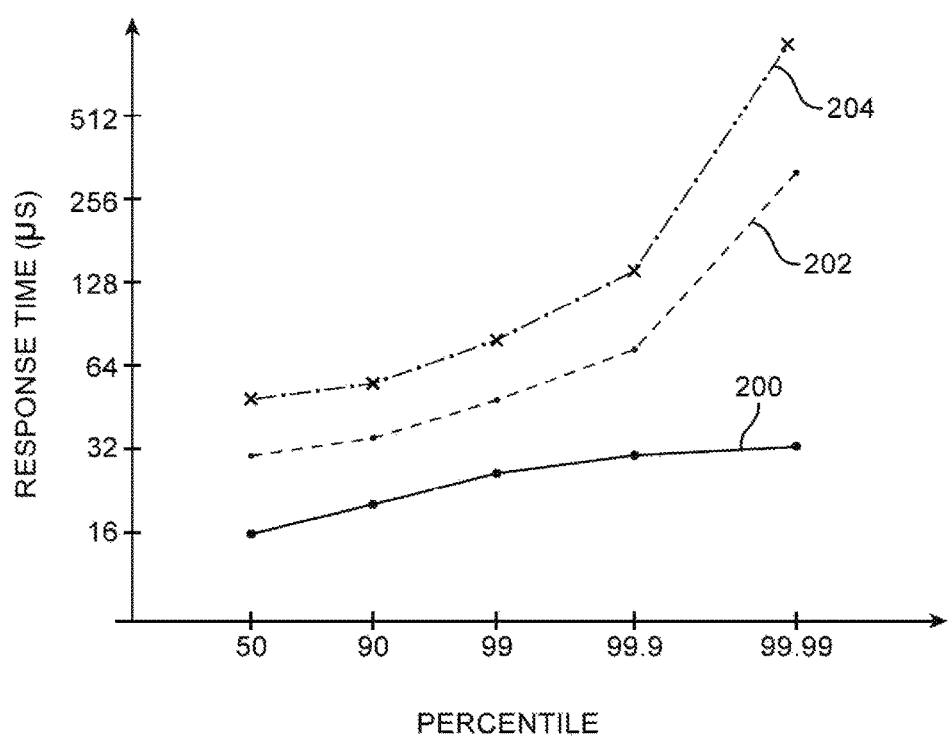
FIG. 2 is a plot that illustrates performance predictability issues associated with NFV hardware acceleration.

Virtually running network functions provides many benefits but can also raise issues related to functionality and performance. FIG. 2 is a diagram that illustrates the impact of virtualization on performance predictability. In general, telecommunications service providers such as AT&T and Verizon require high performance predictability for networks to operate properly. Applications such as distributed in-memory data management, stock trading, video, and other high-performance computing applications demand very low latency or jitter and therefore do not allow for much variability in performance.

In the example of FIG. 2, line 200 plots the response time (in microseconds) associated with a native "bare metal" virtualization implementation, whereas line 202 plots the response time associated with a hosted virtualization implementation. Bare metal virtualization involves installing a hypervisor (i.e., a computer software that creates and runs one or more virtual machines) as the first operating system on a host machine, whereas the hosted virtualization involves installing the hypervisor on top of an already live operating system (i.e., a host OS) running on the host machine. Bare metal virtualization offers direct access to the hardware resources on the host machine and is often used for enterprise solutions. On the other hand, hosted virtualization can only access the hardware through the host OS but allows running of multiple guest operating systems and is therefore often used for desktop solutions.

As shown in the edge case scenarios (i.e., 99.9 to 99.99 percentile edge cases) in FIG. 2, line 202 exhibits much a greater deviation from the mean response time compared to line 200. This increase in latency and variability for the hosted implementation may be due to contention created by the sharing of resources and also overhead associated with extra networking layers that are required for processing among multiple guest operating systems.

In an effort to provide improved performance predictability, datacenter operators (e.g., network orchestrators such as Microsoft, Google, and Amazon, just to name a few) provide resource availability description (RAD) for generic central processing units (e.g., CPUs within equipment 106, 108, and 110 of FIG. 1 that are being used to implement the virtual appliances). The resource availability description, however, only provides local information such as the CPU speed and the amount/type of local storage but does not specify how well the CPU interact with external components. To further enhance the achievable speed of the virtualized networks, a commodity CPU may be coupled to a hardware accelerator or a "coprocessor."

In accordance with an embodiment, the hardware accelerator may be a programmable integrated circuit such as a programmable logic device (PLD). The latency associated with a virtualized network that includes such types of hardware acceleration is represented by line 204 in FIG. 2. As illustrated in FIG. 2, the use of a programmable computing unit can further degrade performance predictability (e.g., the edge cases for line 204 deviates even more from the mean compared to lines 200 and 202). Moreover, existing hardware acceleration is bespoke with no dynamic reconfigurability. Dynamic reconfigurability in accelerators can help offer enhanced flexibility and agility, improved data path line rate performance, and optimized power efficiency in virtualized networks. It would therefore be desirable to provide an improved accelerator usage scheme for NFV that keeps performance predictability high while allowing for the use of configurable devices.

Figure 3:
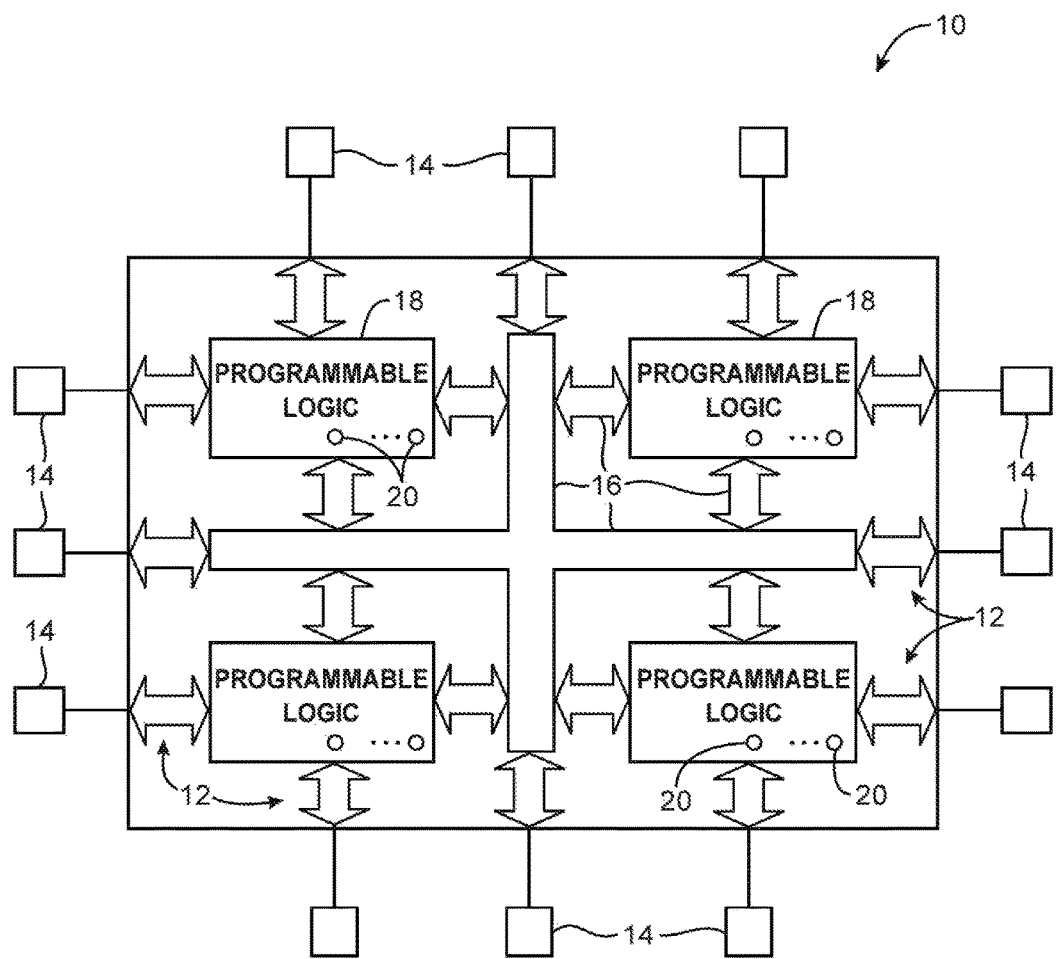
FIG. 3 is a diagram of an illustrative programmable integrated circuit in accordance with an embodiment.

An illustrative integrated circuit of the type that may be used as a hardware accelerator is shown in FIG. 3. As shown in FIG. 3, integrated circuit 10 may contain memory elements 20. Memory elements 20 may be loaded with configuration data to configure programmable transistors such as pass transistors (sometimes referred to as pass gates or pass gate transistors) in programmable circuitry (programmable logic) 18.

Because memory elements 20 may be used in storing configuration data for programmable logic 18, memory elements 20 may sometimes be referred to as configuration random-access memory elements (CRAM). Integrated circuit 10 may be configured to implement custom logic functions by configuring programmable logic 18, so integrated circuit 10 may sometimes be referred to as a programmable integrated circuit.

As shown in FIG. 1, programmable integrated circuit 10 may have input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 may include fixed interconnects (conductive lines) and programmable interconnects (i.e., programmable connections between respective fixed interconnects).

Programmable logic 18 may include combinational and sequential logic circuitry. Programmable logic 18 may be configured to perform a custom logic function. The programmable interconnects associated with interconnection resources 16 may be considered to form a part of programmable logic 18.

When memory elements 20 are loaded with configuration data, the memory elements each provide a corresponding static control output signal that controls the state of an associated logic component in programmable logic 18. The memory element output signals may, for example, be used to control the gates of metal-oxide-semiconductor (MOS) transistors such as n-channel metal-oxide-semiconductor (NMOS) pass transistors in programmable components such as multiplexers, logic gates such as AND gates, NAND gates, etc. P-channel transistors (e.g., a p-channel metal-oxide-semiconductor pass transistor) may also be controlled by output signals from memory elements 20, if desired. When a memory element output that is associated with an NMOS pass transistor is high, the pass transistor controlled by that memory element is turned on and passes logic signals from its input to its output. When the memory element output is low, an NMOS pass transistor is turned off and does not pass logic signals. P-channel metal-oxide-semiconductor (PMOS) pass transistors are turned on when the signal that is applied to its gate from the output of a memory element is low (e.g., 0 volts) and are turned off when the output of the memory element is high (i.e., the polarity for NMOS and PMOS control signals is reversed).

Configuration random-access memory elements 20 may be arranged in an array pattern. There may be, for example, millions of memory elements 20 on integrated circuit 10. During programming operations, the array of memory elements is provided with configuration data. Once loaded with configuration data, memory elements 20 may selectively control (e.g., turn on and off) portions of the circuitry in the programmable logic 18 and thereby customize the circuit functions of circuit 10.

The circuitry of programmable integrated circuit 10 may be organized using any suitable architecture. As an example, the circuitry of programmable integrated circuit 10 may be organized in a series of rows and columns of programmable logic blocks (regions) each of which contains multiple smaller logic regions. The logic resources of integrated circuit 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the circuitry of programmable integrated circuit 10 may be arranged in more levels or layers in which multiple large regions are interconnected to form still larger portions of logic. Still other device arrangements may use logic that is not arranged in rows and columns.

The example of FIG. 3 in which device 10 is described as a programmable integrated circuit is merely illustrative and does not serve to limit the scope of the present invention. The method and apparatus described herein may be incorporated into any suitable circuit. For example, the method and apparatus may also be incorporated into numerous types of devices such as microprocessors, digital signal processors, application specific standard products (ASSPs), application specific integrated circuits (ASICs), programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), just to name a few.

Figure 4:
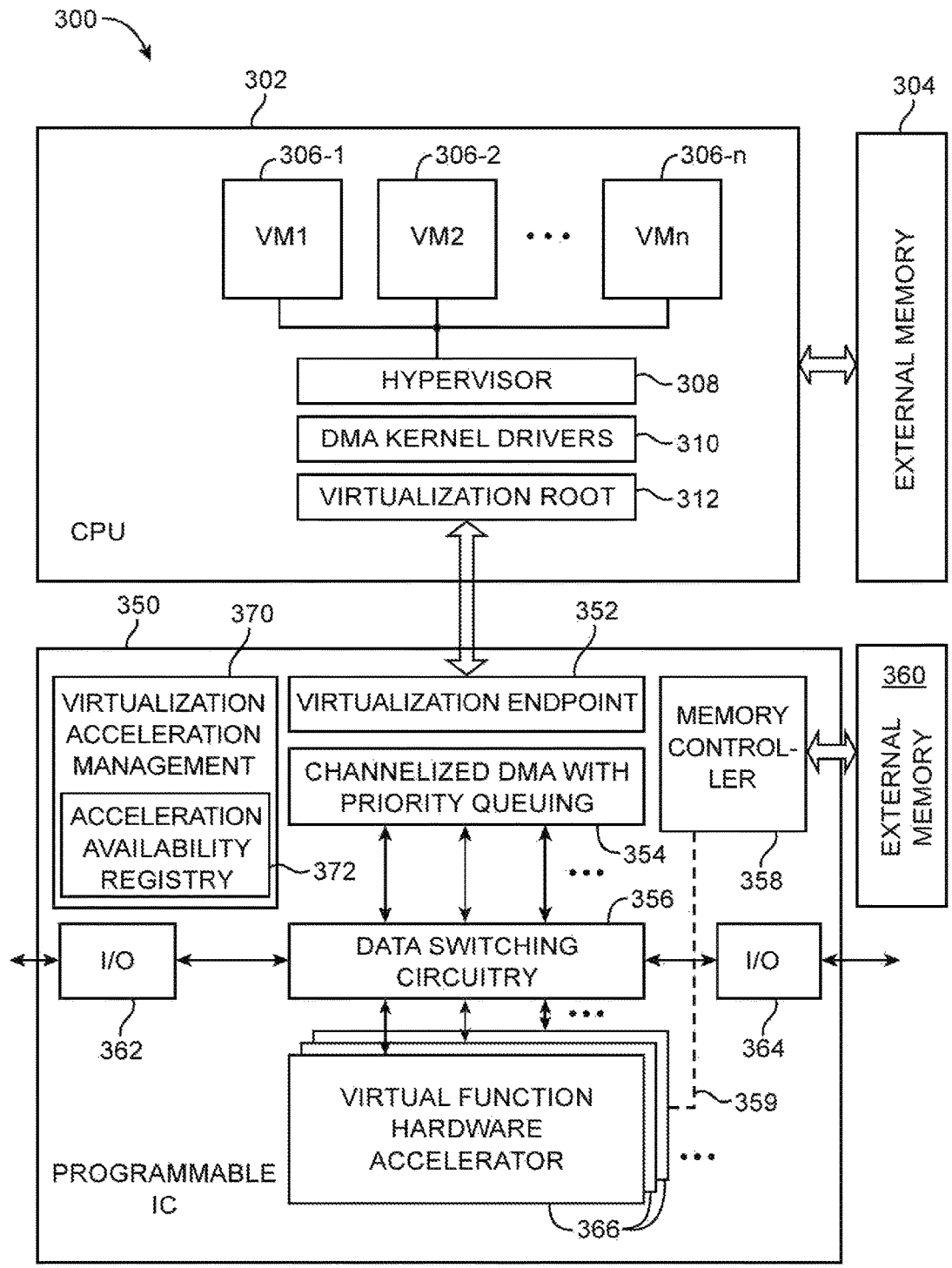
FIG. 4 is a diagram of an illustrative NFV platform that includes a central processing unit (CPU) coupled to a programmable hardware accelerator in accordance with an embodiment.

FIG. 4 is a diagram on an illustrative NFV platform 300 where a central processing unit (CPU) 302 is coupled to a hardware accelerator coprocessor such as a programmable integrated circuit 350. As shown in FIG. 4, software/firmware running on CPU 302 may include at least a hypervisor 308 and N associated virtual machines 306 (e.g., virtual machines 306-1, 306-2, ..., 306-n), direct memory access (DMA) kernel drivers 310, and a virtualization root 312. CPU 302 on which hypervisor 308 is installed may be referred to as the "host machine."

As described above, hypervisor 308 may serve as a virtual machine monitor (VMM) that runs one or more virtual machines 306 on a server. Each virtual machine 306 may be referred to as a "guest machine" and may each run a guest operating system (OS). The hypervisor presents the guest operating systems with a virtual operating platform and manages the execution of the guest operating systems while sharing virtualized hardware resources. Hypervisor 308 may run directly on the host's hardware (as a type-1 bare metal hypervisor) or may run on top of an existing host operating system (as a type-2 hosted hypervisor). If desired, additional paravirtualization drivers and tools (not shown) may be used to help each guest virtual machine communicate more efficiently with the underlying physical hardware.

Direct memory access (DMA) kernel driver module 310 may be used to allow certain hardware subsystems to access a system memory 304 (e.g., one or more external memory devices that are coupled directly to the host machine via a system bus) while providing minimal disruption to the operation of CPU 302. For example, DMA module 310 can help assist communications to system memory 304 for auxiliary devices that are coupled to CPU 302 such as programmable device 350, network cards, disk drive controllers, graphics cards, sound cards, etc.

In the example of FIG. 4, root 312 may serve as a root complex that interfaces with a corresponding endpoint 352 in accelerator 350 using the Peripheral Component Interconnect Express (PCIe) standard. In a PCIe system, a root complex may refer to a device configured to connect a CPU to other PCIe endpoints and/or PCIe switches to which PCIe endpoints and other types of endpoints may be connected. A root complex is typically implemented with a full PCIe protocol stack that includes the transaction layer, data link layer, and physical layer. The use of a PCIe bus to connect CPU 302 and coprocessor 350 is merely illustrative. If desired, other types of input-output interface technologies can be used, including the Industry Standard Architecture (ISA) bus standard, the Micro Channel Architecture (MCA) bus standard, the Video Electronics Standards Association Local Bus (VESA) bus standard, the legacy PCI bus standard, the Accelerated Graphics Port (AGP) bus standard, the Universal Serial Bus (USB) standard, the Universal Asynchronous Receiver/Transmitter (UART) bus standard, etc.

Still referring to FIG. 4, software/firmware running on coprocessor 350 may also include at least a memory controller 358 (e.g., a memory controller for interfacing with external memory 360 that is directly coupled to coprocessor 350), a channelized DMA module 354 with priority queueing, data switching circuitry 356, input/output (IC) components 362 and 364, one or more virtual function hardware accelerator 366, and an associated virtualization acceleration management module 370.

Each accelerator 366 may serve to provide hardware acceleration for one or more of the virtual machines 306 running on host processor 302. Components 362 and 364 may serve as ingress and/or egress interfaces for communicating with other IC devices that are coupled to coprocessor 350. Data switching circuitry 356 may be configured to route data among the accelerators 366, IC components 362 and 364 and channelized DMA module 354. Accelerators 366 may also communicate with memory controller 358 via path 359.

In accordance with an embodiment, virtualization acceleration management module 370 may be configured to maintain an acceleration availability registry 372 that can be exposed to higher level network management and orchestration layers as part of the resource availability description (RAD). Module 370 may be controlled by the hypervisor 308 and/or associated software drivers on the host processor. Registry 372 may define a hierarchy of levels corresponding to different resource availability response times. Revealing the expected latency associated with different types of available resources associated with the coprocessor using hierarchical registry 372 can help maximize network reconfigurability and flexibility without penalizing the system performance predictability.

FIG. 5 is a diagram of an illustrative hierarchical accelerator availability registry 372. As shown in FIG. 5, registry 372 may be a list of available resources that are ordered according their performance predictability. For example, a first type (i.e., class-1) of resources may represent any on-chip resources that are active on the coprocessor. Since the resources are already active on the coprocessor, any acceleration that is provided by such type of resources is fast and predictable.

A second type (i.e., class-2) of resources may represent any partial reconfiguration (PR) accelerator image that is available locally (e.g., an accelerator image that is stored "on board"). For example, the PR image may be stored locally on external flash memory or on dynamic random-access memory (DRAM) that is directly attached to the coprocessor. In order to engage these resources, the PR image may be used to at least partially reconfigure the coprocessor. Partial reconfiguration operations may require some overhead and is generally considered less predictable than class-1 resources.

A third type (i.e., class-3) of resources may represent any PR library path that is remotely reachable (e.g., an accelerator image that is stored on a remote network). For example, the PR image may be stored remotely on a server that is accessible via a local area network (LAN) or on a server that is accessible via a wide area network (WAN). In order to engage such type of resources, the PR image may need to be fetched before it can be loaded into the coprocessor. Fetching the remote image may depend on the current network congestion level and is therefore generally considered to be even less predictable than class-2 resources.

The different types or classes of resources listed in the exemplary registry 372 are merely illustrative and are not intended to limit the scope of the present invention. If desired, registry 372 may include any number of classes (e.g., more than three types of resources, more than five types of resources, more than 10 types of resources, etc.), ordered in an increasing or decreasing order of performance predictability.

Figure 6:
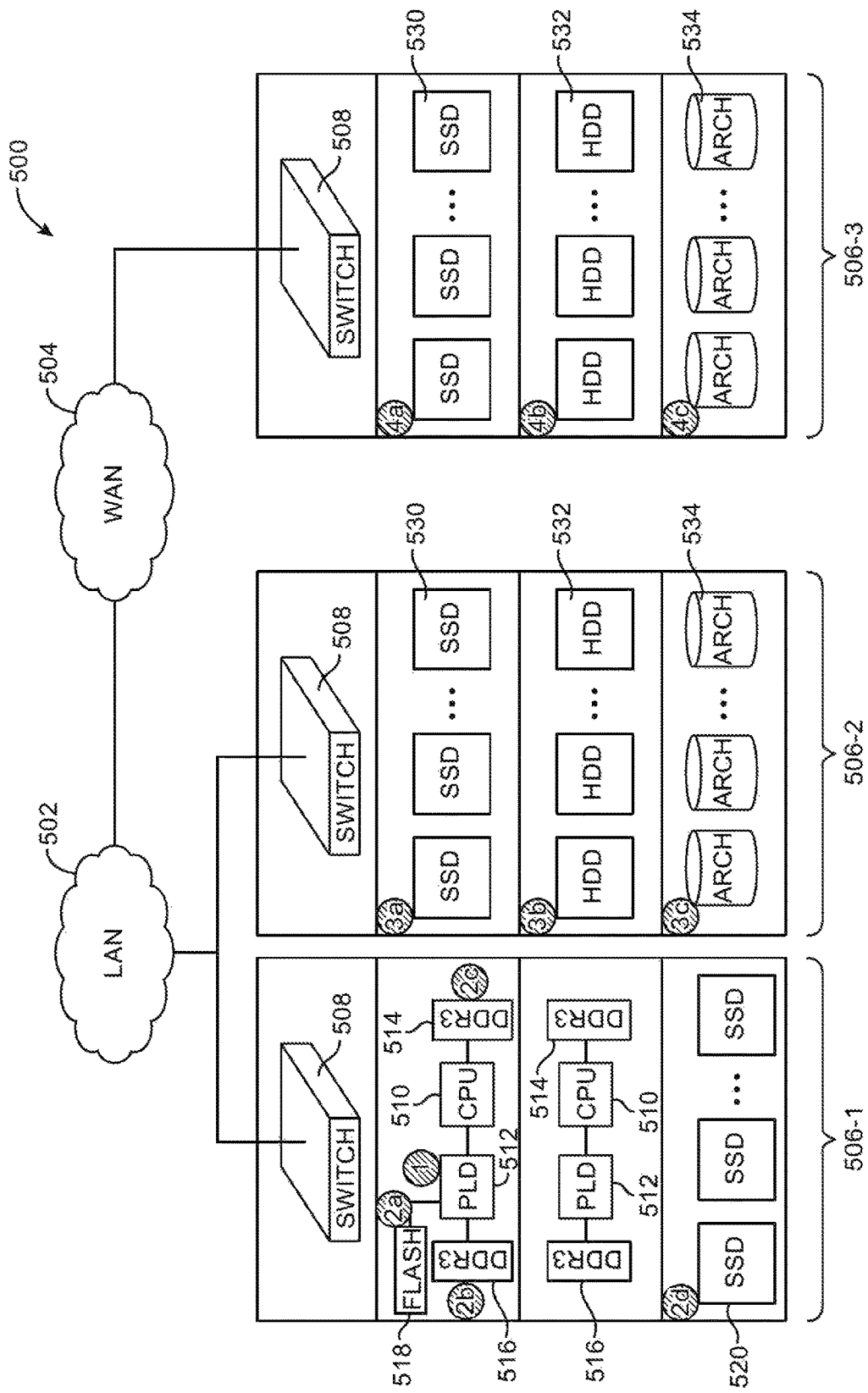
FIG. 6 is a diagram that illustrates hardware associated with different classes in a hierarchical accelerator registry of the type shown in FIG. 5 in accordance with an embodiment.

FIG. 6 is a diagram that illustrates how different components within a network 500 may be assigned different classes and associated speed grades. As shown in FIG. 6, a first server rack 506-1 may be coupled to a second server rack 506-2 via a local area network 502, and the first and second server racks may be coupled to a third server rack 506-3 via a wide area network connection 504. For example, racks 506-1 and 506-2 may be located in San Francisco, whereas rack 506-3 may be located in New York. Each rack 506 may generally include at least one switch 508 at the top of the rack that is coupled to an external network.

Consider, for example, a server CPU 510 that resides in rack 506-1 and that is coupled to an associated reconfigurable hardware accelerator (e.g., a programmable logic device) 512. In general, more than one CPU and associated accelerator may be mounted in each rack 506. A hierarchical accelerator availability registry of the type described in connection with FIG. 5 may be maintained using a virtualization acceleration management module on PLD 512 and may be used to assign a class to different types of available resources that can be used for NFV.

Any resources that are actively available on the coprocessor 512 may be assigned class-1. Resources such as partial reconfiguration image that resides on flash memory 518 and a double data rate (DDR) synchronous dynamic random-access memory (SDRAM) 516 may be assigned class-2a and class 2b, respectively. Resources such as PR image that resides on DDR memory 514 that is directly coupled to CPU 510 may be assigned class-2c. Since memory 516 and 518 can communicate directly with coprocessor 512, whereas memory 514 can only communicate with coprocessor 512 via CPU 510, the class-2a and class-2b resource types are considered to be faster and thus more predictable than the class-2c resource type. Resources such as PR image that resides locally on one of solid-state drives (SSD) 520 may be assigned class-2d, which is considered to be even slower than class-2c resources.

Coprocessor 512 in rack 506-1 may retrieve PR image remotely via a local area network 502. Still referring to FIG. 6, an image that is stored on a SSD 530, on a hard disk drive (HDD) 532, and on an archive (backup) subsystem 534 within rack 506-2 may be assigned class types of 3a, 3b, and 3c, respectively. Class-3a resources are generally considered to be faster and more predictable than class-3b resources. Class-3b resources are generally considered to be faster and more predictable than class-3c resources. Since class-3 (i.e., class 3a, 3b, 3c, etc.) resources are stored on a separate server rack, retrieval of class-3 resources are slower and less predictable than that of class-2 resources.

Coprocessor 512 in rack 506-1 may also retrieve PR image from over wide area network 504. An image that is stored on a SSD 530, on a hard disk drive (HDD) 532, and on an archive (backup) subsystem 534 within rack 506-3 may be assigned class types of 4a, 4b, and 4c, respectively. Class-4a resources are generally considered to be faster and more predictable than class-4b resources. Class-4b resources are generally considered to be faster and more predictable than class-4c resources. Since class-4 (i.e., class 4a, 4b, 4c, etc.) resources are stored on an even more remote server rack, retrieval of class-4 resources are even slower and less predictable than that of class-3 resources.

The class types and speed grade examples described in connection with FIG. 6 are merely illustrative and are not intended to limit the scope of the present embodiments. If desired, more than four different class types can be assigned to various network resources, more than three speed grades can be assigned within a certain class (i.e., speed grades a, b, c, d, etc.), and accelerator 512 may obtain available resources from yet other types of networks.

Figure 7:
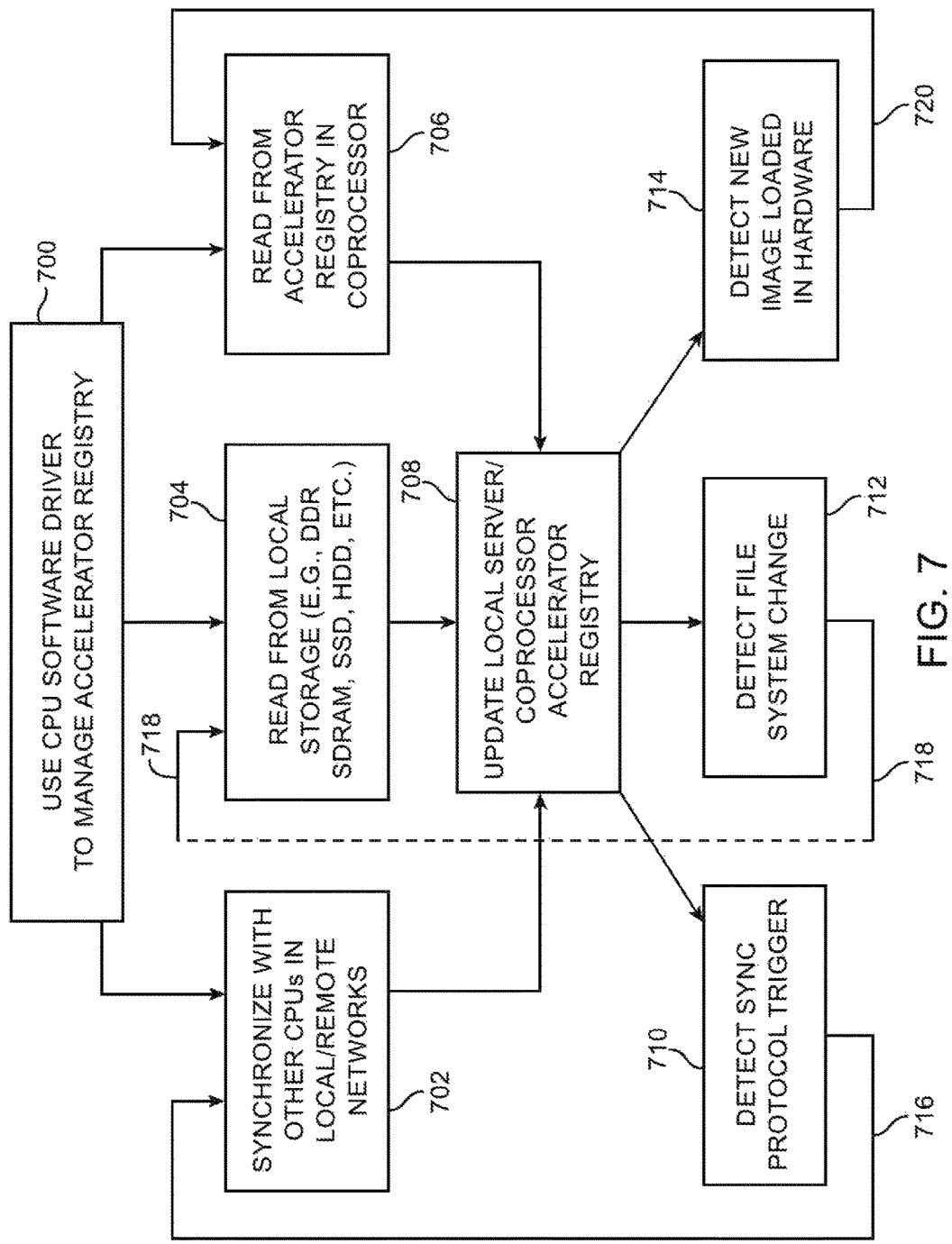
FIG. 7 is a diagram of illustrative steps for updating a hierarchical accelerator registry of the type shown in FIG. 5 in accordance with an embodiment.

The content of the accelerator availability registry 372 may be managed using the CPU hypervisor and/or associated software drivers 700 on the host CPU (see, e.g., FIG. 7). As shown in FIG. 7, software drivers 700 may synchronized with other CPUs in local/remote networks to obtain a list of available resources associated with the synchronized CPUs (at step 702), may read from local storage (e.g., from DDR random-access memory, solid-state devices, hard disk drives, and other local storage devices) to obtain a list of available resources in the local server (at step 704), and may read from the accelerator registry in the coprocessor to obtain the current state of the accelerator registry (at step 706).

At step 708, the local server accelerator registry may be updated based on the information obtained from steps 702, 704, and 706. For example, the hypervisor may combine the information obtained from step 702 and 704 and apply the combined information to the current registry to generate an updated registry. In situations where the current registry is not up-to-date, resource availability information obtained during step 702 and/or resource availability information obtained during step 704 may introduce new information that can be used to add new entries or remove existing entries from the local server accelerator registry.

Various events may trigger periodic updates to the accelerator registry. As an example, step 702 may be performed again to update the local server accelerator registry in response to detecting a synchronization protocol trigger (at step 710), as indicated by loop back path 716. The triggering protocol may be any protocol that can be used to exchange information between the local CPU and any remote CPUs.

As another example, step 704 may be performed again to update the local server accelerator registry in response to detecting a file system change (at step 712), as indicated by loop back path 718. For instance, the hypervisor may detect that a change in image location (e.g., when an image is being moved, copied, or deleted on the local server).

As yet another example, step 706 may be performed again to update the local server accelerator registry in response to detecting that a new image has been loaded into the hardware accelerator (step 714), as indicated by loop back path 720. For instance, the host driver software may detect that the coprocessor has been reprogrammed using a locally/remotely retrieved partial reconfiguration image. When the coprocessor has been reconfigured, the hardware registry may also be automatically updated with the corresponding changes. This will help ensure that any change to the coprocessor is being reflected in the hardware acceleration registry.

The programmable logic device described in one or more embodiments herein may be part of a data processing system that includes one or more of the following components: a processor; memory; IC circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:
1. An integrated circuit, comprising:
 a plurality of virtual function hardware accelerators; and
 a virtualization acceleration management module that manages an acceleration availability registry, wherein the acceleration availability registry maintains a directory of different types of resources, wherein the acceleration availability registry assigns a first speed grade to hardware acceleration resources that are external to the integrated circuit and that are used to reconfigure the plurality of virtual function hardware accelerators;
 wherein the acceleration availability registry assigns a second speed grade that is different than the first speed grade to hardware acceleration resources that are internal to the integrated circuit.

2. The integrated circuit of claim 1, wherein the second speed grade is faster than the first speed grade.

3. The integrated circuit of claim 2, wherein the acceleration availability registry assigns a first level of predictability to hardware acceleration resources that are external to the integrated circuit.

4. The integrated circuit of claim 1, wherein the acceleration availability registry assigns a first level of predictability to hardware acceleration resources that are external to the integrated circuit.

5. The integrated circuit of claim 4, wherein the acceleration availability registry assigns a second level of predictability that is different than the first level of predictability to hardware acceleration resources that are internal to the integrated circuit.

6. The integrated circuit of claim 5, wherein the first level of predictability is more predictable than the second level of predictability.

7. A method of operating an integrated circuit that is connected to a network, comprising:
- using virtual function hardware accelerators on the integrated circuit to accelerate performance for at least some virtual machine in the network;
- using a virtualization acceleration management module to manage and update an acceleration availability registry that lists a plurality of hardware acceleration resources for reconfiguring the virtual function hardware accelerators;
- identifying a first hardware acceleration resource located at a first location in the network using the acceleration availability registry; and
- identifying a second hardware acceleration resource located at a second location in the network that is different than the first location using the acceleration availability registry.

8. The method of claim 7, wherein the first location in the network is external to the integrated circuit.

9. The method of claim 8, wherein the second location in the network is internal to the integrated circuit.

10. The method of claim 7, wherein the first and second locations are both external to the integrated circuit.

11. The method of claim 10, wherein the first location is at a local network, and wherein the second location is at a remote network.

12. The method of claim 7, further comprising:
- in response to reading data from local storage in the network, updating the acceleration availability registry.

13. The method of claim 7, further comprising:
- in response to synchronizing the integrated circuits with other processing units in the network, updating the acceleration availability registry.

14. The method of claim 7, further comprising:
- in response to reading current status information from the acceleration availability registry, updating the acceleration availability registry.

15. A system, comprising:
- a host processor having a hypervisor that runs virtual machines; and
- a coprocessor having accelerators for accelerating the performance of the virtual machines, wherein the coprocessor includes a virtualization acceleration management module that identifies a first type of the hardware acceleration resources internal to the coprocessor and a second type of the hardware acceleration resources external to the coprocessor, wherein the first and second types of hardware acceleration resources are both used to reconfigure the accelerators, wherein the second type of hardware acceleration resource comprises resources selected from the group consisting of: accelerator image files stored in flash memory that is external to the coprocessor, accelerator image files stored in random-access memory that is external to the coprocessor, accelerator image files stored in random-access memory that is external to the coprocessor, accelerator image files stored in a selected one of a solid-state drive and a hard disk drive, and accelerator image files stored in an archive subsystem.

* * * * *